(12) United States Patent
St. John (10) Patent No.: US 7,383,941 B2
(45) Date of Patent: Jun. 10, 2008

(54) BOLT DIVERSION SYSTEM (75) Inventor: Barry St. John, Southside, AL (US)

(73) Assignee: Honda Motor Co., Ltd., Tokyo (JP)

( * ) Notice: Subject to any disclaimer, the term of this patent is extended or adjusted under 35 U.S.C. 154(b) by 391 days.

(21) Appl. No.: 11/206,443

(22) Filed: Aug. 18, 2005

(65) Prior Publication Data
US 2007/0039804 A1 Feb. 22, 2007

(51) Int. Cl.
*B65G 47/76* (2006.01)
(52) U.S. Cl. .................... 198/636; 198/836.1
(58) Field of Classification Search ........ 198/635–637, 198/836.1, 836.3
See application file for complete search history.

(56) References Cited

U.S. PATENT DOCUMENTS

| | | | |
|---|---|---|---|
| 3,236,360 A * | 2/1966 | Winter | 198/637 |
| 3,543,916 A * | 12/1970 | Berk | 198/367 |
| 3,596,752 A | 8/1971 | Garvey | |
| 4,077,506 A * | 3/1978 | Schlottmann et al. | 198/367 |
| 4,173,274 A * | 11/1979 | Kantarian et al. | 198/367 |
| 4,295,418 A | 10/1981 | Lang-Ree | |
| 4,298,117 A * | 11/1981 | Kobayashi et al. | 198/367 |
| 4,349,098 A | 9/1982 | Veenhof | |
| 4,428,090 A | 1/1984 | Coggin et al. | |
| 4,580,676 A | 4/1986 | Michelbrink et al. | |
| 4,712,667 A | 12/1987 | Jackson et al. | |
| 4,741,431 A | 5/1988 | Whitehead | |
| 4,944,386 A | 7/1990 | Swinderman | |
| 4,953,692 A | 9/1990 | Stoppani et al. | |
| 5,058,728 A | 10/1991 | Leiweke et al. | |
| 5,247,778 A | 9/1993 | Tisma | |
| 5,564,881 A | 10/1996 | Campbell | |
| 5,671,838 A | 9/1997 | Bowman | |
| 5,716,185 A | 2/1998 | Campbell et al. | |
| 5,875,881 A | 3/1999 | Brink | |
| 5,887,699 A * | 3/1999 | Tharpe | 198/367 |
| 6,910,568 B1 * | 6/2005 | Ydoate et al. | 198/370.07 |
| 2004/0050667 A1 | 3/2004 | Wiese et al. | |

* cited by examiner

*Primary Examiner*—Mark A Deuble
(74) *Attorney, Agent, or Firm*—Rankin, Hill & Clark LLP; Vincent Ciamacco (57) ABSTRACT

A bolt diversion system for use with a conveyor system having a conveyor chain for towing a movable cart. The bolt diversion system is used to prevent debris from interfering with operation of the conveyor chain. The bolt diversion system includes first and second rails, disposed vertically and spaced from one another so as to define a slot therebetween. Lower faces of the rails are disposed close to and in overlapping relationship to upper lateral edges of the chain so as to define a small gap between the first and second rails and the conveyor chain that is smaller than the debris, so that the debris remains in the slot and on top of the conveyor chain. The debris is conveyed by the conveyor chain to a debris removal zone in which a wiper arm assembly is provided. The wiper arm assembly includes a wiper arm that extends across a top of the conveyor chain. The wiper arm knocks debris off of the conveyor chain and into a debris collection container.

23 Claims, 10 Drawing Sheets

BOLT DIVERSION SYSTEM

BACKGROUND OF THE INVENTION

1. Field of the Invention

The present invention is generally directed toward conveyor systems and, more particularly, toward tow conveyor systems incorporating devices for preventing debris from interfering with the conveyor operation.

2. Description of Related Art

A tow conveyor system includes a chain having a number of chain links joined together end-to-end to form a continuous or endless chain that is received in a track. The links are typically joined so as to allow a degree of pivotal motion to accommodate bends in the track.

Figure 8:
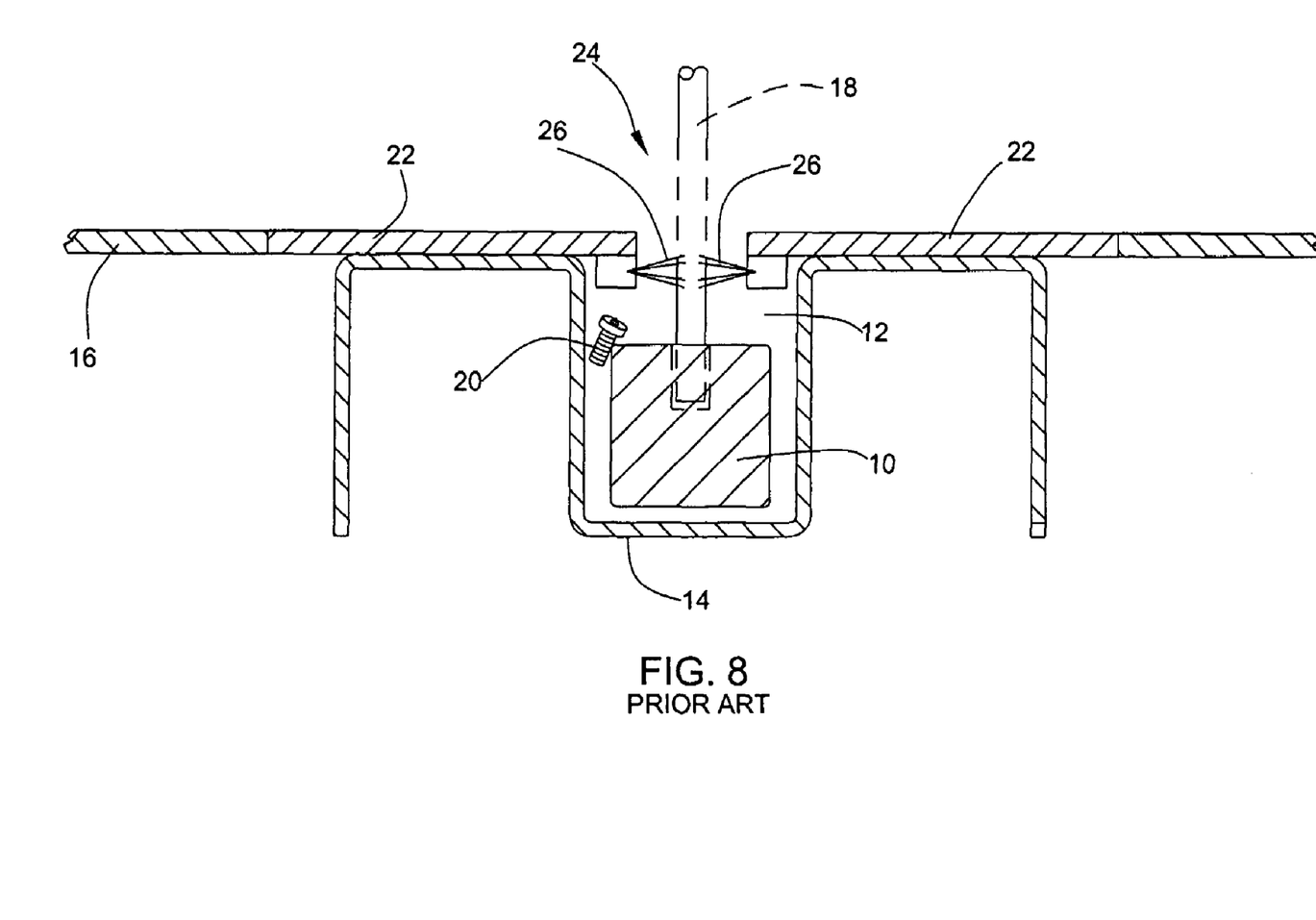
FIG. 8 shows a conveyor track of the type used in a conventional conveyor, along with a prior art device for blocking debris.

As shown in FIG. 8, a prior art conveyor chain 10 is received within a recessed track or channel 12, formed by a metal structural member 14 that is disposed under a factory floor 16. The conveyor chain 10 is configured to receive a kingpin 18 extending downwardly from a mobile carrier or cart (not shown) that is pulled by the chain 10 past one or more workstations.

Conveyor systems are often used in manufacturing facilities, where various components of a manufactured article are assembled at each work station. Such assembly may use various fasteners, including threaded members such as bolts. Often, bolts 20 and other such debris are dropped and end up on the floor. This debris can find its way into the recessed channel 12 housing the conveyor chain 10. In some circumstances, the debris becomes wedged between the chain 10 and the side of the channel 12, causing the chain 10 to have an uneven or jerking motion. Sometimes, the debris jams the chain 10, breaking one or more shear pins on the main gear box drive, and requiring the conveyor to be shut down until necessary repairs can be made.

In response to this problem, it has been proposed, as shown in FIG. 8, to provide a pair of horizontal plates 22 that are disposed over the top of the channel 12 and have side surfaces that face each other at a fixed distance, so as to define a slotted aperture 24 over the top of the channel 12. A series of semi-rigid brushes 26 project inwardly from beneath the side surfaces and extend toward each other. In this way, it was expected that the brushes 26 would prevent bolts 20 and other debris from entering the slotted aperture 24 and interfering with the chain 10, while still allowing the kingpin 18 to move through the slotted aperture 24.

However, it has been found that the brushes 26 are ineffective at preventing debris from entering the channel 12. It is believed that the brushes 26 deform over time as a result of repeated engagement with the kingpins 18, causing a gap to develop between the brushes 26 that allows debris to fall into the channel 12. Further, since the brushes 26 are disposed below the floor surface, it is believed that once debris is received by the brushes 26, it is difficult for the debris to escape except for passing through the brushes 26 into the channel 12. It is also believed that the brushes 26 lack strength to hold certain types of debris, and that the kingpin 18 may actually force the debris past the brushes 26. In any event, the brushes 26 require frequent maintenance and replacement in order to maintain their effectiveness, and conveyor downtime remains a problem despite this proposed remedy. Accordingly, there exists a need in the art for a structure that prevents debris from interfering with conveyor operation.

SUMMARY OF THE INVENTION

The present invention is directed toward correcting difficulties and drawbacks associated with known systems by providing a conveyor system incorporating a bolt diversion system that prevents debris from interfering with conveyor operation.

In accordance with the present invention, the bolt diversion system includes first and second rails that extend vertically and are spaced from one another so as to define a slot therebetween. The rails are mounted at a location proximate to, but above, the conveyor chain in a position overlapping lateral edges of the conveyor chain and, as such, a small gap is provided between the first and second rails and the conveyor chain that is smaller than the debris that may interfere with conveyor operation. Accordingly, debris entering the slot remains on top of the chain and is conveyed thereby to a debris removal zone.

In further accordance with the present invention, a wiper assembly is provided at the debris removal zone to remove debris being carried on top of the conveyor chain. The wiper arm assembly includes a wiper arm that extends across the conveyor chain so as to be adjacent the top surface of the conveyor chain. The wiper arm directs debris being carried on the conveyor chain into a collection receptacle.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
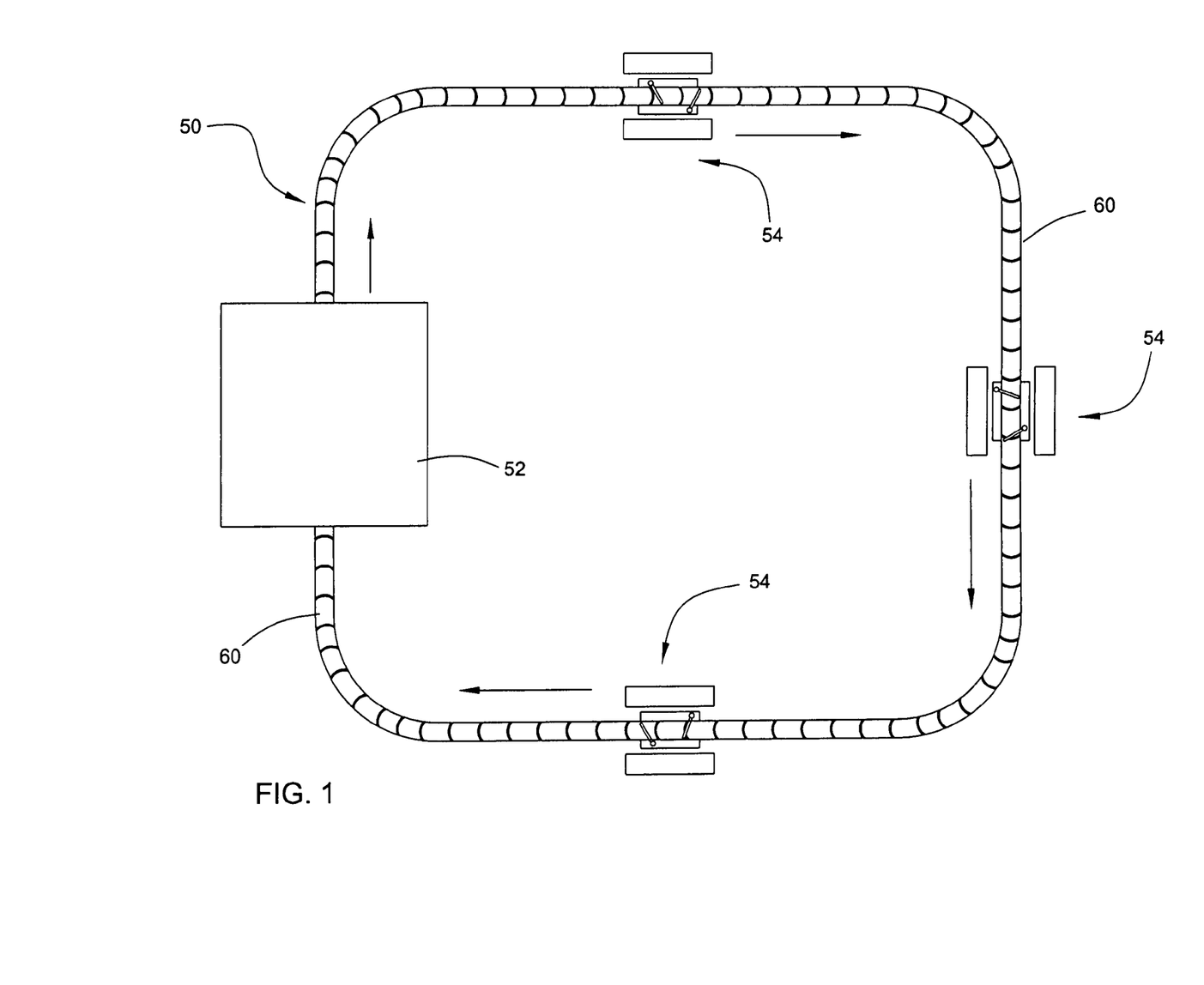
FIG. 1 is a schematic illustration of a conveyor system incorporating the bolt diversion system according to the present invention.

With reference to FIG. 1, a conveyor system 50 incorporating a bolt diversion system of the present invention is illustrated. The present conveyor system 50 includes a loading/unloading station 52 and a plurality of debris removal zones 54. The loading/unloading station 52 is adapted for placing one or more movable articles, preferably mobile carriers or carts, on the conveyor at the start of the conveyor cycle, and for removing the mobile carriers at the end of the conveyor cycle. In the preferred and illustrated embodiment, the conveyor system 50 is a tow conveyor system including a conveyor chain 60 for pulling the mobile cart along the conveyor path and past one or more workstations. It will be appreciated that the circular configuration of the conveyor system is only one example, and that the present invention is not limited thereto.

Figure 2:
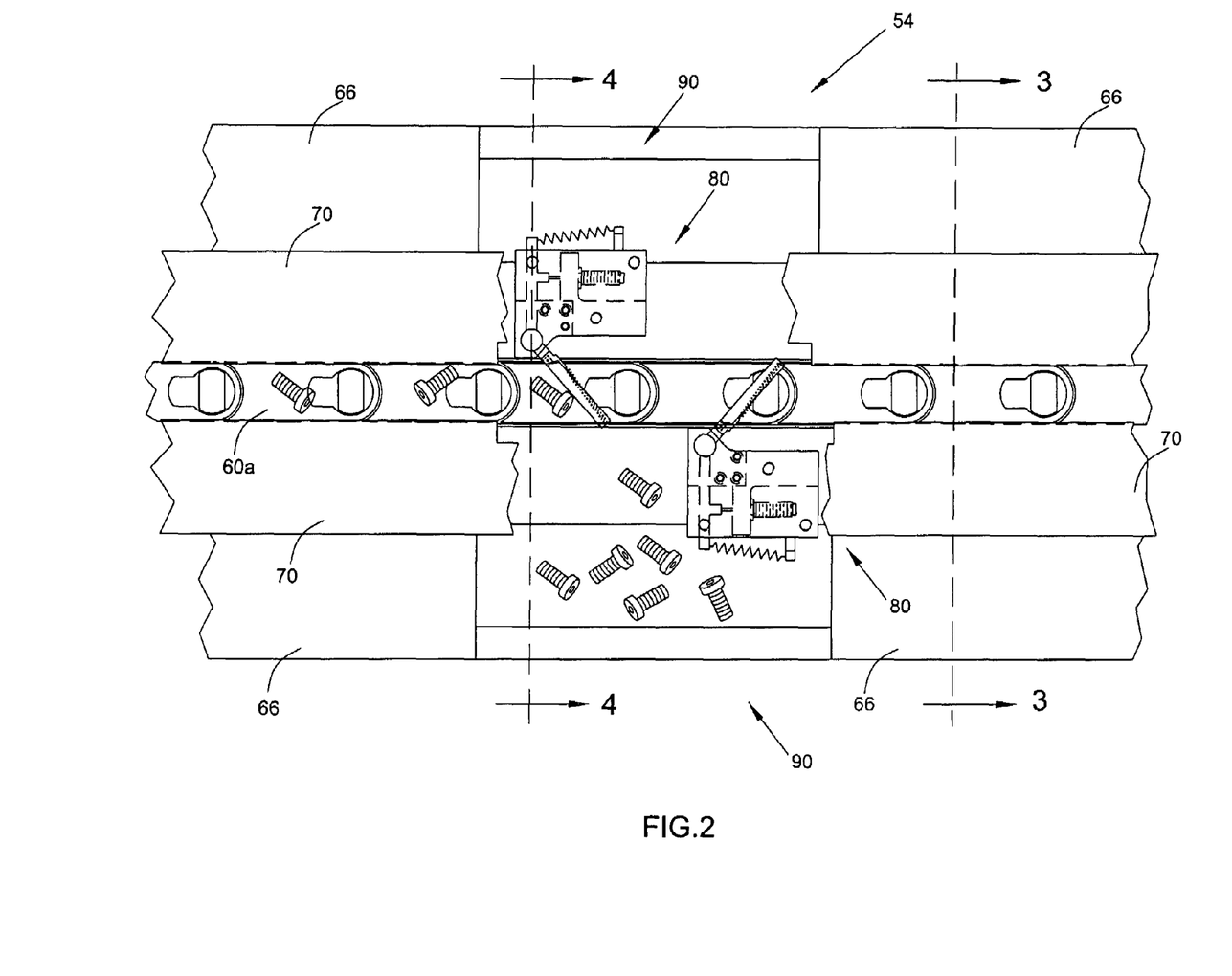
FIG. 2 is a top view illustrating a debris removal zone according to present invention.

As particularly shown in FIG. 2, the conveyor chain 60 is formed of a plurality of links 60a that are pivotally connected to each in a known fashion so as to enable the chain 60 to follow curves at the corners of the conveyor system 50. Each link 60a includes an upper surface 60b, a pair of lateral side surfaces 60c, and a bottom surface 60d. The upper surfaces 60b of the links 60a cooperate to define an upper surface of the chain 60. Lateral portions of the chain upper surface 60b (i.e., portions adjacent the side surfaces 60c) are hereinafter referred to as the lateral edges of the upper surface 60b. Further, each link includes an engagement portion or opening 60e for receiving a kingpin 68 of an associated mobile cart 68b, as will be described hereinbelow.

The chain 60 is received within a guide assembly that follows and defines the conveyor path. The guide assembly includes a guide 64 and a pair of cap plates 70. It will be appreciated that the guide 64 is substantially symmetrical about a central axis and that the cap plates 70 are substantially identical to one another.

Figure 3:
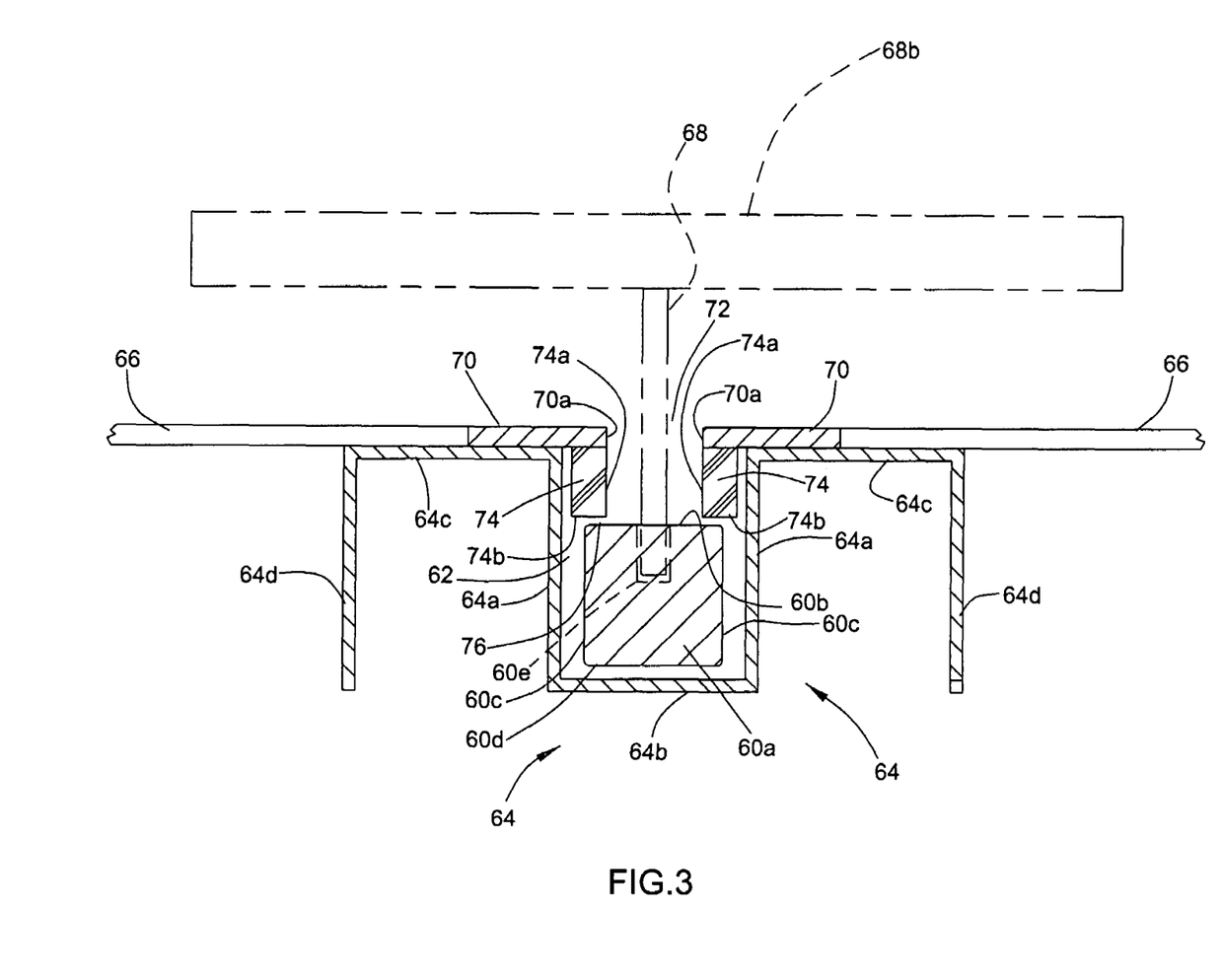
FIG. 3 is a cross-sectional view as seen along line 3-3 of FIG. 2.

The guide 64 is preferably disposed below a floor surface 66, and defines a recessed channel 62. The guide 64 includes a pair of inner vertical walls 64a, a bottom wall 64b, a pair of top walls 64c, and a pair of outer vertical walls 64d, as shown best in FIG. 3. Each of the cap plates 70 are associated with one of the guide top walls 64c, and are set into the floor so as to be flush with the floor surface 66. The cap plates 70 are supported by the associated top wall 64c so as to cover an associated lateral portion of the channel 62, as illustrated in FIG. 3.

Each of the cap plates 70 have an inwardly directed side surface 70a that faces toward the other cap plate side surface 70a. The cap plate side surfaces 70a cooperate to define a slot 72 over the top of the channel 62. The slot 72 has a reduced width as compared to that of the channel 62 and, with the exception of debris removal zones 54, preferably extends uninterrupted the length of the conveyor system 50.

The present bolt diversion system includes first and second rails 74 and a wiper assembly 80 that cooperate to retain debris on the top of the conveyor chain 60 and, when the debris reaches one of the debris removal zones 54, to remove the debris from the top of the chain 60 into a collection receptacle 90.

The first and second rails 74 are generally rectangular in shape and have inwardly facing side surfaces 74a and downwardly facing bottom surfaces 74b. The rails 74 are secured to, and extend downwardly from, an underside of an associated one of the cap plates 70 adjacent the side surfaces 70a thereof. As such, the rail inner surfaces 74a are substantially flush with the side surfaces 70a of the associated cap plate 70, and face toward one another so as to further define the slot 72 and extend a depth dimension of the slot 72.

The rail bottom surfaces 74b face toward, and are slightly spaced from, the upper surface 60b of the conveyor chain 60. More specifically, the downwardly-facing rail bottom surfaces 74b overlap lateral edges of the chain upper surface 60b, as illustrated. Accordingly, a small gap 76, which is sized to prevent entry of debris therethrough that would cause jamming of the conveyor chain 60 or otherwise interfere with operation of the conveyor, is provided between the rail bottom surface 74b and the chain upper surface 60b. Therefore, potentially damaging debris is retained on the chain upper surface 60b within the slot 72 between the rails 74 and is conveyed with the chain 60 to the next debris removal zone 54, described hereinafter.

In the preferred embodiment, the first and second rails 74 are formed of a low friction polymer material, such as nylon. It is contemplated that the rails 74 can be installed with new conveyor cap plates 70 or retrofitted onto the cap plates in existing conveyor systems. The rails 74 are preferably secured to the associated cap plate 70 by mechanical fasteners extending through the cap plates 70 from above. Although the rails 74 are preferably spaced from the chain upper surface 60b, it is also contemplated that the rail bottom surface 74b may slidably engage the chain upper surface 60b, either continuously or intermittently, if desired.

With reference to FIGS. 1, 2, 4-7, the wiper assembly 80 includes a wiper arm assembly 82, a stop assembly 104, a main body 106, a lower mounting plate 108, and the collection receptacle 90. Preferably, a pair of oppositely-directed wiper assemblies 80 is provided at each debris removal zone 54, as will be apparent from the following description and is shown in FIG. 1. In the debris removal zone, the rails 74, a portion of the floor surface 66, and portions of the guide 64 are removed, and the wiper assembly 80 is mounted on an underside of the guide top wall 64c. The portion of the floor surface 66 is removed, as shown best in FIG. 4, to permit access to the collection receptacle 90 from above. Naturally, a removable cover (no shown) may be installed to normally close or cover the receptacle opening. Preferably, a plurality of threaded fasteners 109 extend through the guide top wall 64c and are threadably received in corresponding openings 102 in the main body 106 to mount the wiper assembly 80 in place.

Figure 6:
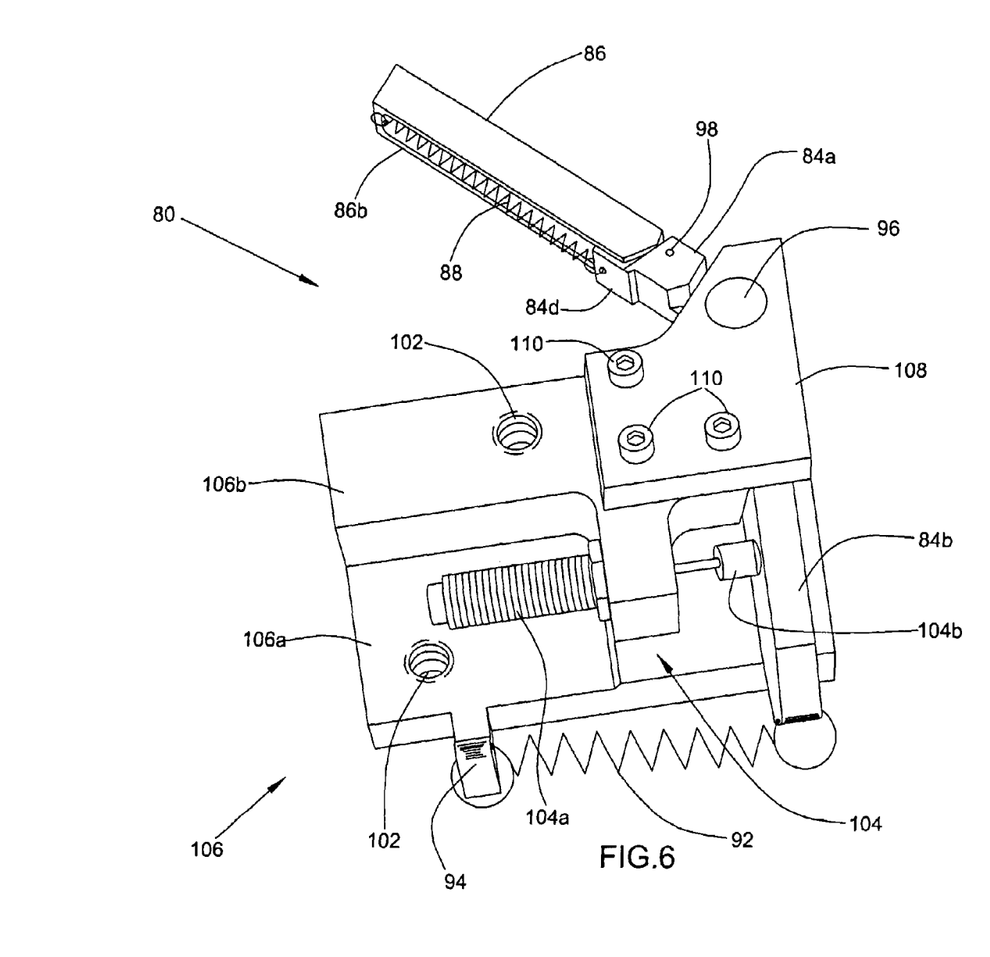
FIG. 6 is a perspective view of the wiper assembly according to the present invention.
Figure 7:
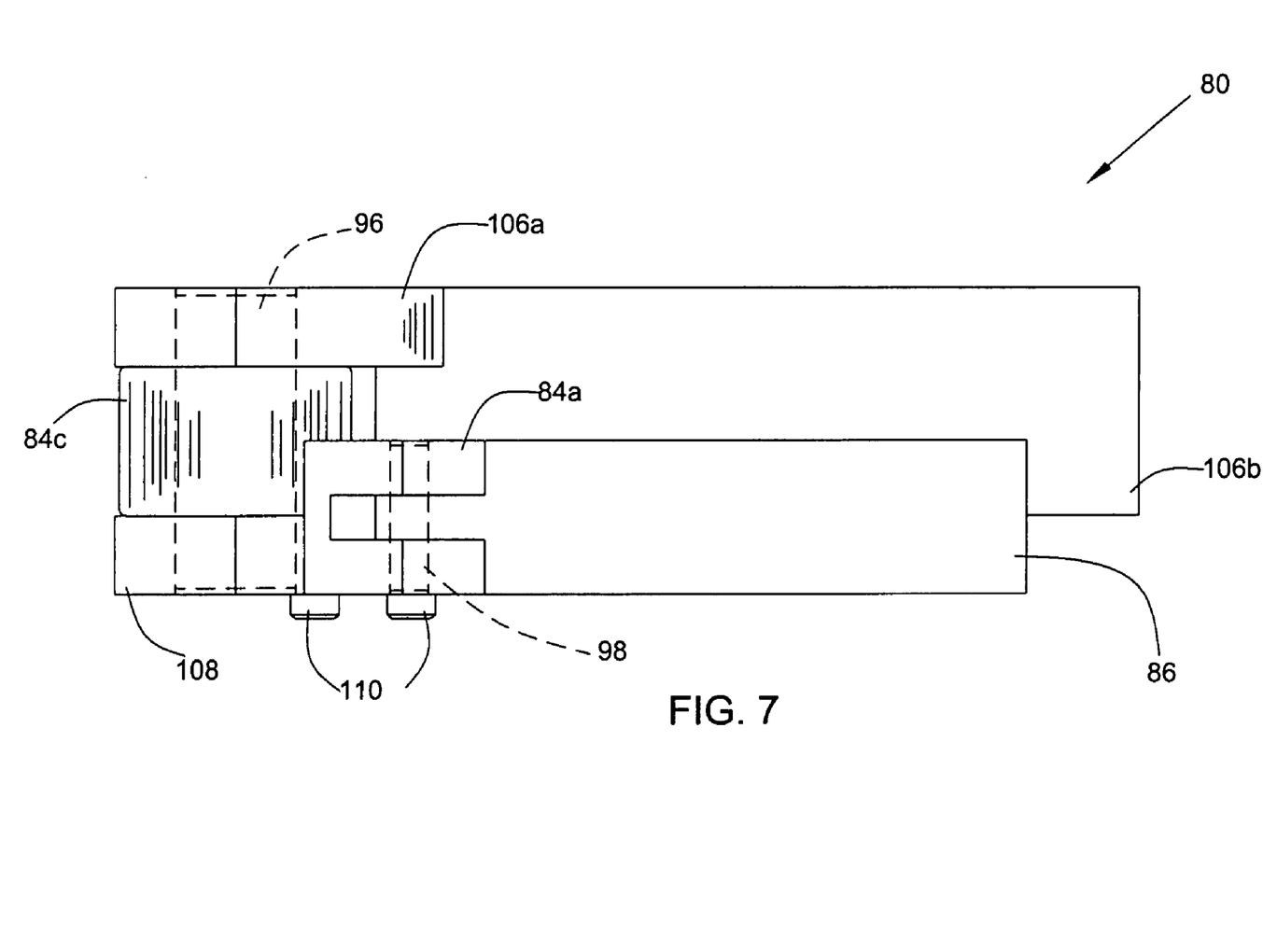
FIG. 7 is an end elevational view of the wiper assembly.

The main body 106 includes a flat base plate 106a that is secured to the underside of the guide top wall 64c, and a downwardly extending mounting block 106b to which the lower mounting plate 106 and stop assembly 104 are secured.

The lower mounting plate 108 is a flat plate that is secured to a downwardly facing surface of the mounting block 106b via a series of bolts 110. The lower mounting plate 108 cooperates with the flat base plate 106a of the main body 106 and a first hinge pin 96 to pivotally mount the wiper arm assembly 82, described hereinafter.

The stop assembly 104 includes a stud 104a that is threadably received in a horizontal bore formed in the mounting block 106b and from which a stop member 104b extends. A lock nut holds the stud 104a in place. The extension amount of the stop member 104b is adjustable so as to vary a position in which the stop member 104b engages a rigid arm 84 of the wiper arm assembly 82, and thereby serves to limit a range of movement of the wiper arm assembly 82 in a first direction, as will be apparent from the following description.

The wiper arm assembly 82 includes a wiper arm 86, the rigid arm 84, a first biasing spring 88, a second biasing spring 92, and a fixed mount 94 for the second biasing spring 92.

The rigid arm 84 includes a first portion 84a, a second portion 84b, and a cylindrical portion 84c disposed between and interconnecting the first and second portions 84a, 84b. The cylindrical portion 84c is disposed between the lower mounting plate 108 and the base plate 106a of the main body portion 106 and receives the first hinge pin 96 to secure the rigid arm 84, and the wiper arm 86 associated therewith, for pivotal motion. In this regard the cylindrical portion 84c may be considered as a bearing or bushing that rotates around the first hinge pin 96.

The first portion 84a of the rigid arm 84 extends from an upper end of the cylindrical portion 84c and has a finger 84d extending from a distal end thereof. The finger 84d serves as a stop for the wiper arm 86 and as a mount for the first biasing spring 88, as described more fully hereinafter.

More specifically, the distal end of the rigid arm first portion 84a is bifurcated so as to define upper and lower spaced apart mounts, each of which have an aligned opening formed therein for receipt of a second hinge pin 98. The wiper arm 86 has a proximal end, including an extension 86a that fits between the upper and lower mounts. The extension 86a has an opening formed therein through which the second hinge pin 98 extends to pivotally secure the wiper arm 86 to the rigid arm first portion 84a.

The finger 84d extends from the distal end of the rigid arm first portion 84a and along a first side 86b of the wiper arm 86 at the proximal end thereof. A first end of the first biasing spring 88 is secured to the finger 84d while the second end of the first biasing spring 88 is secured to a distal end of the wiper arm 86. Preferably, the first side 86b of the wiper arm 86 has a lengthwise extending groove formed therein to receive at least a portion of the first biasing spring 88. The first biasing spring 88 urges the wiper arm 86 into a position wherein the first side 86b of the wiper arm proximal end is in engagement with the rigid arm finger 84d, and in which the wiper arm 86 is substantially aligned with the rigid arm first portion 84a, as illustrated.

The rigid arm second portion 84b extends from a lower end of the cylindrical portion 84c, and extends across a downwardly facing surface of the main body 106. A first end of the second biasing spring 92 is secured to a distal end of the rigid arm second portion 84b, while a second end of the second biasing spring 92 is secured to the fixed mount 94, which is welded to or otherwise integrally provided by the main body portion 106. The second biasing spring 92 urges the rigid arm second portion 84b into engagement with the stop member 104b, as illustrated.

Figure 4:
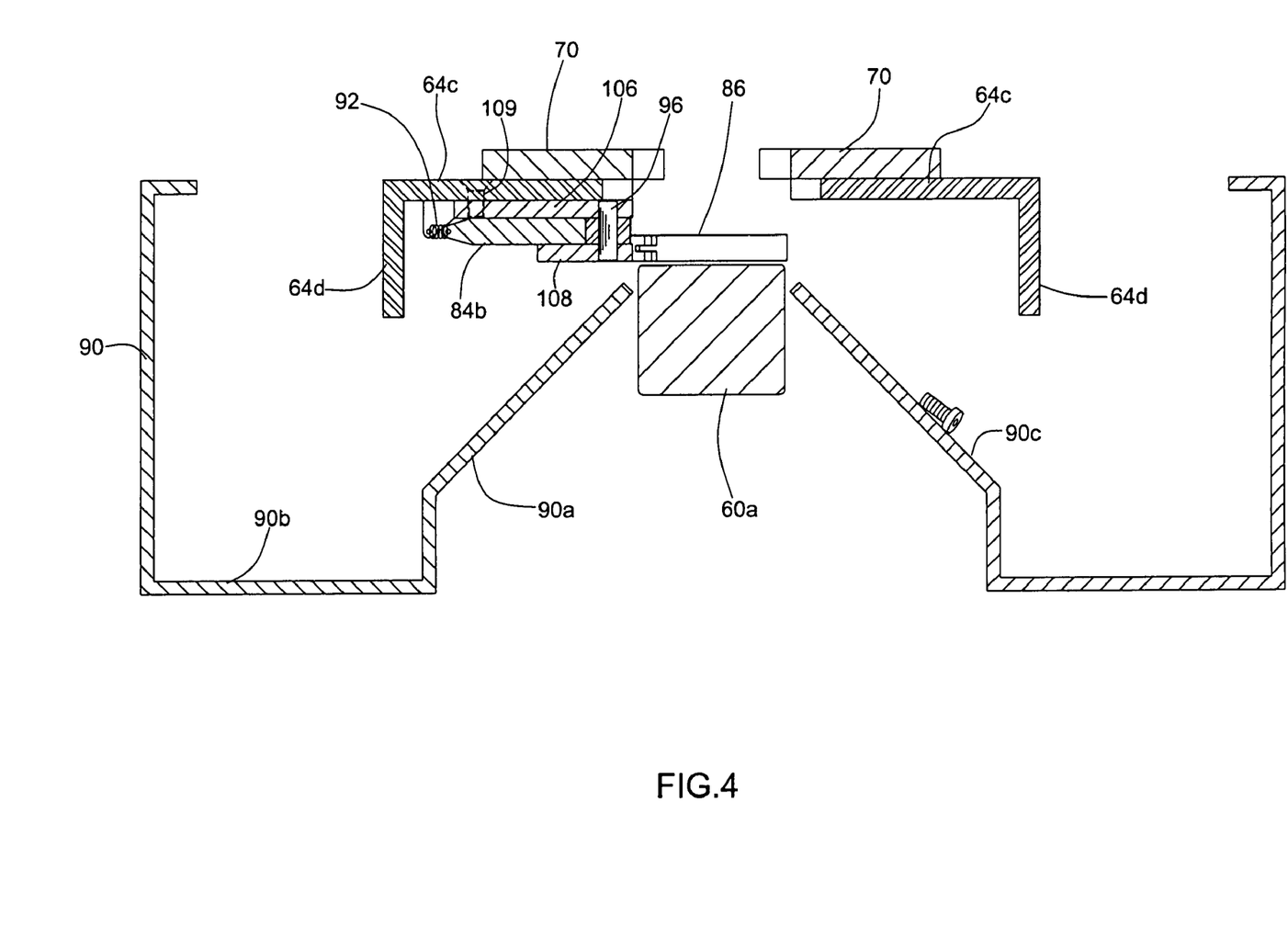
FIG. 4 is a cross-sectional view as seen along line 4-4 of FIG. 2.

The collection receptacle 90 is disposed in a position to collect debris that is brushed or knocked off of the chain 60 by the wiper arm 86, as is shown in FIG. 4. More particularly, the receptacle 90 includes an inlet ramp 90a and a bin 90b. The ramp 90a is disposed adjacent one lateral side surface 60c of the chain 60 and leads downwardly to the bin 90b. Debris moved off of the chain upper surface 60a by the wiper arm 86 falls down along the inlet ramp 90a into the bin 90b and collects therein.

Figure 5A:
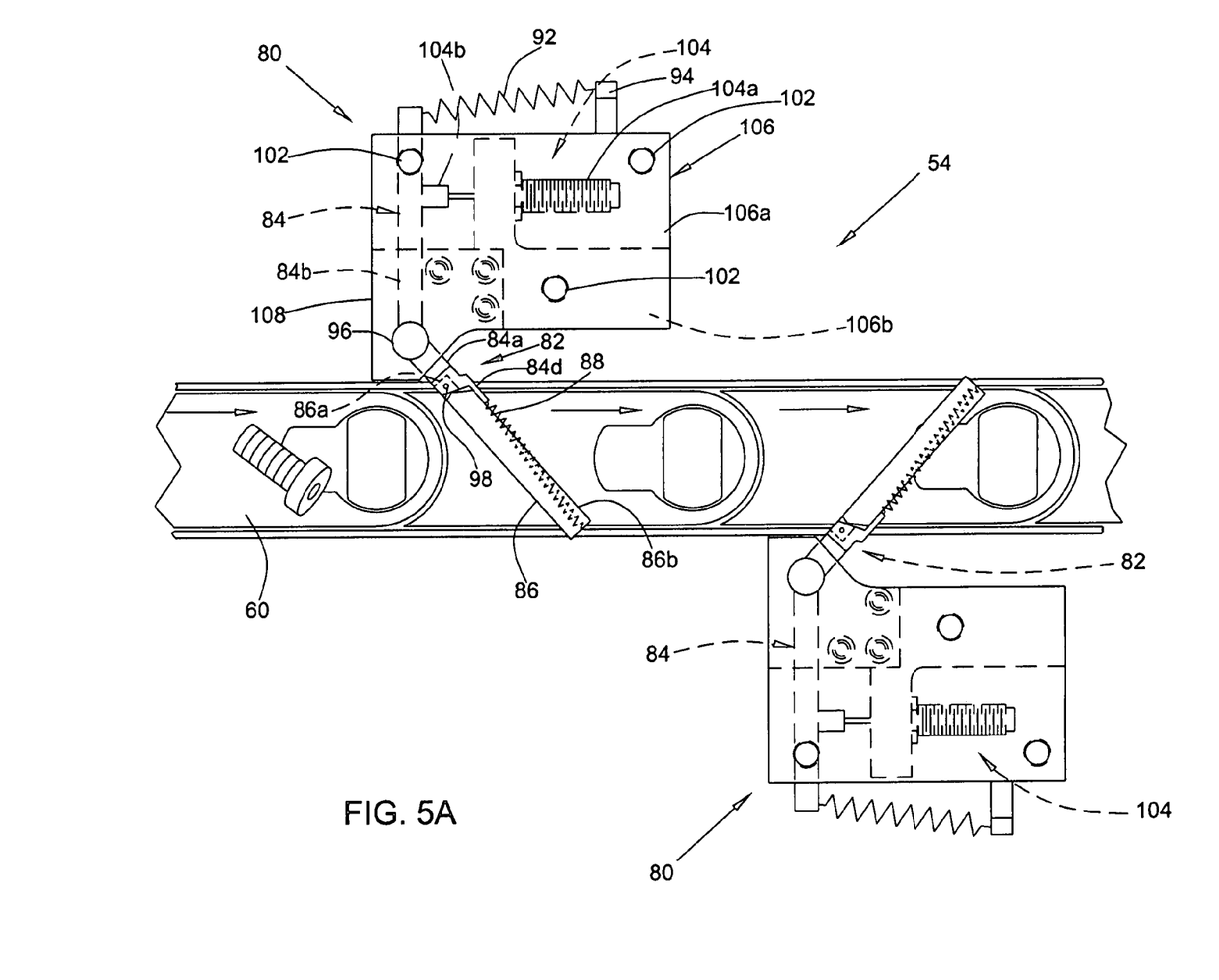
FIGS. 5A, 5B and 5C illustrate the debris removal zone according to the present invention, and show wiper assemblies according to the present invention in various states of use.
Figure 5B:
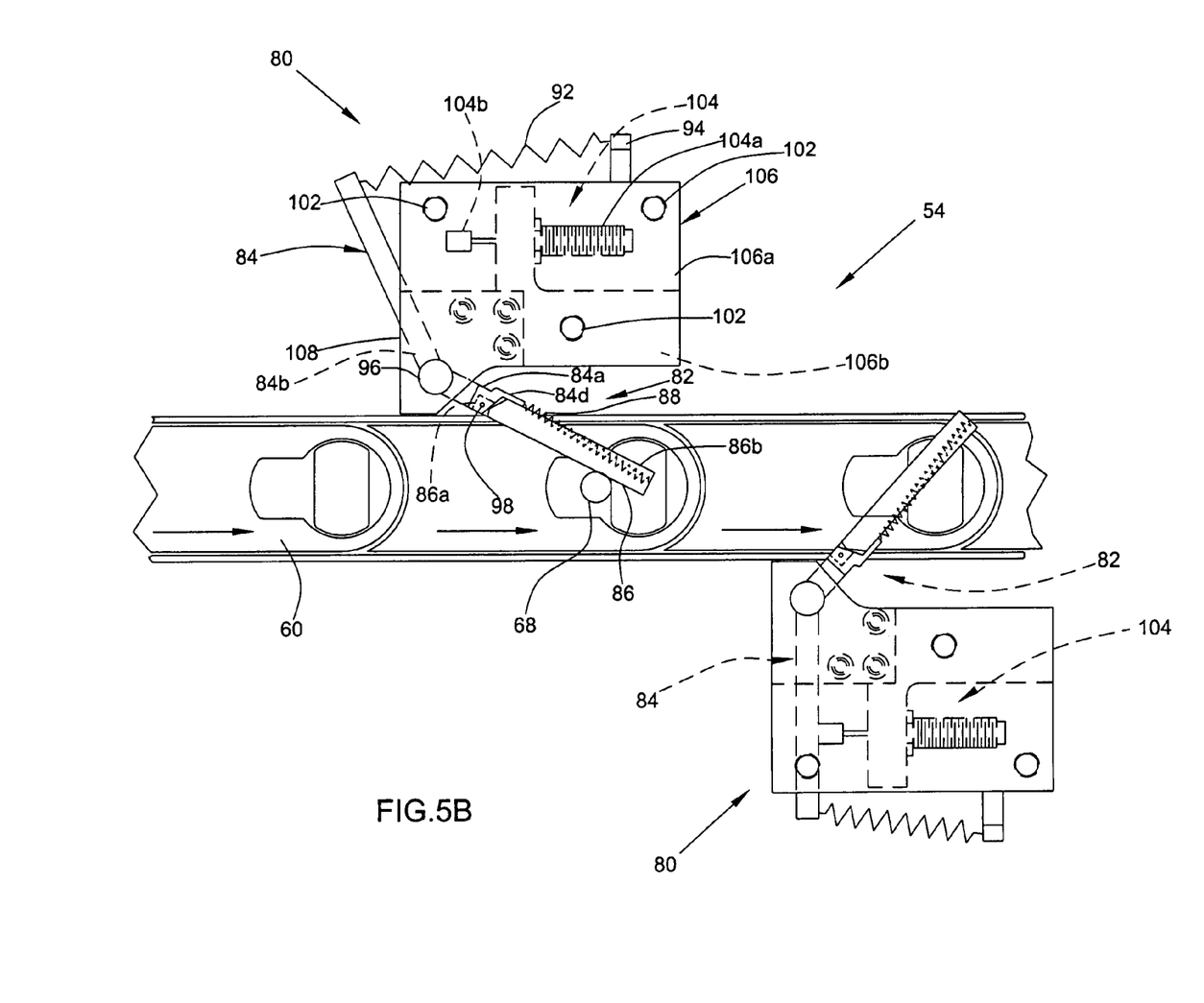
Figure 5C:
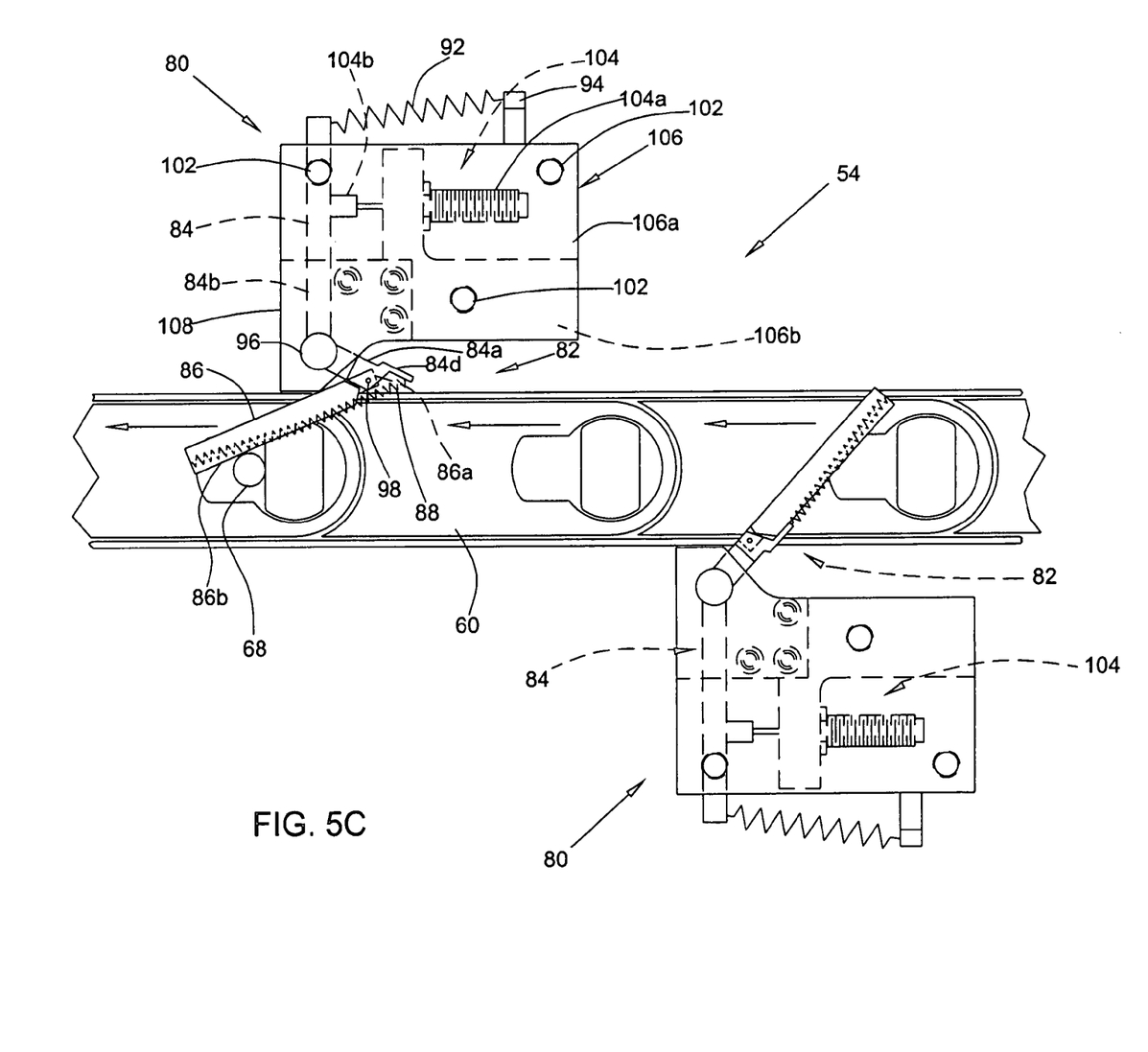

With reference to FIGS. 5A-5C, operation of the wiper assemblies 80 at a debris removal zone 54 will be described hereinafter.

FIG. 5A illustrates the wiper assemblies 80 when the conveyor 60 is operated in a first direction, and in a condition in which the wiper arm assemblies 82 are at rest. As such, the wiper arms 86 extend across the top 60c of the conveyor chain 60a (see FIG. 4), and are biased toward the rest positions by operation of the springs 88, 92. In this position, should a bolt or other debris engage the wiper arm 86, the bolt or debris will be brushed or knocked off of the top of the conveyor 60 and into the collection receptacle 90. It will be appreciated that the second spring 92 biasing the wiper arm assembly 82 into the rest position illustrated in FIG. 5A will have sufficient strength to retain the wiper arm assembly 82 in the rest position when debris is encountered, but will permit the wiper assembly 82 to pivot into a deflected or second position upon encountering a stronger or immovable obstacle, such as the kingpin 68.

With reference to FIG. 5B, the wiper assemblies 80 are illustrated in a condition in which one of the kingpins 68 engages the wiper arm 86. As illustrated, the wiper arm assembly 82 is pivoted around the hinge pin 96 and against the biasing force of the second spring 92, such that the rigid arm 84 moves outwardly and such that the wiper arm 86 rides over the kingpin 68. When the kingpin 68 moves beyond the wiper arm 86, the second spring 92 rotates the wiper arm assembly 82 back to the rest position by pulling the rigid arm 84 into contact with the stop member 104b.

With reference to FIG. 5C, the wiper assembly 80 is illustrated in a condition in which the conveyor 60 is operated in a second or opposite direction and in which the kingpin 68 engages the second side 86b of the wiper arm 86. The wiper arm 86 is pivoted about the second hinge pin 98 against the biasing force of the first spring 88. The wiper arm 86 rides over the kingpin 68, and when the kingpin 68 has cleared the wiper arm 86, the first spring 88 rotates the wiper arm 86 back into the rest position by pulling the wiper arm 86 into contact with the finger 84d.

While the present invention has been described hereinbefore with particularity, it is considered apparent that the invention is capable of numerous modifications, rearrangements, and substitutions of parts and, therefore, is not limited to the particular preferred embodiment illustrated herein and described hereinbefore. Rather, the invention is only defined by the claims appended hereto.

What is claimed is:

1. A bolt diversion system for preventing debris from interfering with a tow conveyor, the tow conveyor including a conveyor chain, the bolt diversion system comprising:
   first and second rails that vertically extend downward from undersides of first and second horizontal cap plates, respectively, the first and second rails are horizontally spaced so as to define a slot therebetween, wherein a surface of said each of the first and second rails is disposed facing said conveyor chain and overlapping an edge of said conveyor chain such that a gap is defined between the first and second rails and the conveyor chain, said gap being sized such that the debris remains on a top of the conveyor chain;
   a wiper arm assembly disposed between the conveyor chain and the first and second horizontal cap plates, said wiper arm assembly including a wiper arm that extends across the top of the conveyor chain whereby said wiper arm diverts debris from the top of the conveyor chain into a collection area.

2. The bolt diversion system of claim 1, wherein the first rail is secured to the first horizontal cap plate and the second rail is secured to the second horizontal cap plate.

3. The bolt diversion system of claim 1, wherein the first and second rails are formed from a low friction material.

4. The bolt diversion system of claim 3, wherein the first and second rails are formed from nylon.

5. The bolt diversion system of claim 1, further comprising a collection receptacle for collecting debris diverted from the top of the conveyor chain by the wiper arm.

6. The bolt diversion system of claim 1, wherein the wiper arm is adapted to pivot upon encountering a movable article driven by the conveyor chain.

7. The bolt diversion system of claim 6, wherein the wiper arm assembly comprises a first hinge for pivoting the wiper arm in a first direction upon encountering the movable article driven in the first direction, and a second hinge for pivoting the wiper arm in a second direction upon encountering the movable article driven in the second direction.

8. The bolt diversion system of claim 6, wherein the wiper arm assembly includes biasing springs to restore the wiper arm to a rest position after encountering the movable article.

9. The bolt diversion system of claim 1, further comprising first and second wiper arm assemblies, wherein the first wiper arm assembly is disposed between the conveyor chain and the first horizontal cap plate and is operable to divert debris when the conveyor chain is operating in the first direction, and the second wiper arm assembly is disposed between the conveyor chain and the second horizontal cap plate and is operable to divert debris when the conveyor chain is operating in the second direction.

10. A conveyor system comprising:
a conveyor chain for displacing a movable article;
a bolt diversion system for preventing debris from interfering with the conveyor chain, the bolt diversion system comprising:
first and second rails that vertically extend downward from undersides of first and second horizontal cap plates, respectively, the first and second rails are horizontally spaced apart from one another so as to define a slot therebetween, wherein a surface of said first and second rails is disposed facing said chain such that a gap between the first and second rails and the conveyor chain that is smaller than the debris and such that the debris remains in the slot and on top of the conveyor chain;
a wiper arm assembly disposed between the conveyor chain and the first and second horizontal cap plates, said wiper arm assembly including a wiper arm that extends across the top of the conveyor chain and diverts debris from the top of the conveyor chain into a collection area.

11. The conveyor system of claim 10, wherein the conveyor chain comprises a portion for receiving a member of the movable article.

12. The conveyor system of claim 10, wherein the first rail is secured to the first horizontal cap plate and the second rail is secured to the second horizontal cap plate.

13. The conveyor system of claim 10, wherein the first and second rails are formed from a low friction material.

14. The conveyor system of claim 13, wherein the first and second rails are formed of nylon.

15. The conveyor system of claim 10, further comprising a collection receptacle for receiving debris knocked off of the top of the conveyor chain by the wiper arm.

16. The conveyor system of claim 10, wherein the wiper arm is adapted to pivot upon encountering a movable article driven by the conveyor chain while remaining stationary upon encountering debris.

17. The conveyor system of claim 16, wherein the wiper arm assembly comprises a first hinge for pivoting the wiper arm in a first direction upon encountering the movable article driven in the first direction, and a second hinge for pivoting the wiper arm in a second direction upon encountering the movable article driven in the second direction.

18. The conveyor system of claim 17, wherein the wiper arm assembly includes a biasing spring to restore the wiper arm to a rest position after encountering the movable article.

19. The conveyor system of claim 10, further comprising first and second wiper arm assemblies, wherein the first wiper arm assembly is disposed between the conveyor chain and the first horizontal cap plate and is operable to divert debris when the conveyor chain is operating in the first direction, and the second wiper arm assembly is disposed between the conveyor chain and the second horizontal cap plate and is operable to divert debris when the conveyor chain is operating in the second direction.

20. A wiper arm assembly for removing debris from a conveyor chain that is disposed below horizontal cap plates, comprising:
a wiper arm disposed between said horizontal cap plates and the conveyor chain and extending across a top surface of the conveyor chain, said wiper arm being adapted to knock debris off of the top surface of the conveyor chain while being adapted to pivot to permit a movable article driven by the conveyor chain to move therepast.

21. The wiper arm assembly of claim 20, wherein the wiper arm is normally in a rest position, and wherein the assembly comprises a first hinge permitting the wiper arm to pivot in a first direction away from the rest position to allow the movable article to move therepast in a first direction, and a second hinge permitting the wiper arm to pivot in a second direction to allow the movable article to move therepast in the second direction.

22. The wiper arm assembly of claim 21, wherein the wiper arm assembly includes a biasing spring to restore the wiper arm to the rest position.

23. A method for retaining debris on top of a conveyor chain and for removing retained debris from said conveyor chain, comprising the steps of:
providing first and second rails, said rails being spaced apart from one another so as to define a slot therebetween, and being disposed vertically above said conveyor chain and below first and second horizontal cap plates, so as to provide a rail lower surface facing a top surface of said conveyor chain, said rail lower surface being spaced from said conveyor chain upper surface and overlapping a lateral edge of said conveyor chain upper surface so as to define a gap, said gap being smaller than the debris such that the debris is retained on the conveyor chain top surface and conveyed therewith to a debris removal zone;
providing a wiper arm assembly that is disposed between the conveyor chain and the first and second horizontal cap plates; and,
at said debris removal zone, deflecting retained debris from the top of the conveyor chain and into a collection receptacle with the wiper arm assembly.

* * * * *